United States Patent
Bolshakov (10) Patent No.: US 12,554,149 B2
(45) Date of Patent: Feb. 17, 2026

(54) OPHTHALMIC LENS CONFIGURED TO EXHIBIT A CLEAR STATE AND OPTIONALLY A DARK STATE

(71) Applicant: Essilor International, Charenton-le-Pont (FR)

(72) Inventor: Ilya Bolshakov, Argyle, TX (US)

(73) Assignee: Essilor International, Charenton-le-Pont (FR)

( * ) Notice: Subject to any disclaimer, the term of this patent is extended or adjusted under 35 U.S.C. 154(b) by 535 days.

(21) Appl. No.: 17/923,371

(22) PCT Filed: May 4, 2021

(86) PCT No.: PCT/EP2021/061624
§ 371 (c)(1),
(2) Date: Nov. 4, 2022

(87) PCT Pub. No.: WO2021/224208
PCT Pub. Date: Nov. 11, 2021

(65) Prior Publication Data
US 2023/0194898 A1   Jun. 22, 2023

(30) Foreign Application Priority Data
May 7, 2020   (EP) .................................... 20305461

(51) Int. Cl.
*G02C 7/10*   (2006.01)
(52) U.S. Cl.
CPC ............. *G02C 7/101* (2013.01); *G02C 7/107* (2013.01)

(58) Field of Classification Search
CPC ........ G02C 7/101; G02C 7/107; G02C 7/102; G02B 1/113; G02B 5/23
See application file for complete search history.

(56) References Cited

U.S. PATENT DOCUMENTS

| | | |
|---|---|---|
| 3,679,291 A | 7/1972 | Apfel et al. |
| 2017/0003520 A1 | 1/2017 | Iwasaki et al. |
| 2019/0179169 A1 | 6/2019 | Clerc et al. |

FOREIGN PATENT DOCUMENTS

| | | |
|---|---|---|
| EP | 3457197 | 3/2019 |
| WO | WO 2002/014930 | 2/2002 |
| WO | WO 2019/158717 | 8/2019 |
| WO | WO 2020/021107 | 1/2020 |

OTHER PUBLICATIONS

International Search Report and Written Opinion issued in Corresponding PCT Application No. PCT/EP2021/061624, dated Jul. 8, 2021.

*Primary Examiner* — Tuyen Tra
(74) *Attorney, Agent, or Firm* — Norton Rose Fulbright US LLP

(57) ABSTRACT

Ophthalmic lenses configured to exhibit a clear state and optionally at least one darker state by means of a substrate which may advantageously be photochromic or electrochromic. The ophthalmic lenses may especially be spectacle lenses providing in said clear state a sufficient light transmittance together with an acceptable light reflectance for the wearer, and advantageously forming in said at least one darker state a solar spectacle lens (i.e. for sunglasses) having a mirror front surface providing a mirror effect for the observer.

19 Claims, 1 Drawing Sheet

OPHTHALMIC LENS CONFIGURED TO EXHIBIT A CLEAR STATE AND OPTIONALLY A DARK STATE

CROSS-REFERENCE TO RELATED APPLICATIONS

This application is a national phase application under 35 U.S.C. § 371 of International Application No. PCT/EP2021/061624 filed 4 May 2021, which claims priority to European Patent Application No. 20305461.4 filed 7 May 2020. The entire contents of each of the above-referenced disclosures is specifically incorporated by reference herein without disclaimer.

FIELD OF THE INVENTION

The present invention relates to an ophthalmic lens configured to exhibit a clear state and optionally at least one darker state by means of a substrate which may advantageously be photochromic or electrochromic. The ophthalmic lens may especially be a spectacle lens providing in said clear state a sufficient light transmittance together with an acceptable light reflectance for the wearer, and advantageously forming in said at least one darker state a solar spectacle lens (i.e. for sunglasses) having a mirror front surface providing a mirror effect for the observer.

DESCRIPTION OF RELATED ART

Multilayered interferential coatings for ophthalmic lenses are well known in the art, and such coatings may for instance form an antireflection coating or a reflective (i.e. mirror) coating.

An antireflection coating usually consists of interferential thin layers, generally an alternation of layers based on a dielectric material of high refractive index and a dielectric material of low refractive index. When deposited on a transparent substrate, the function of such a coating is to reduce its light reflection and therefore to increase its light transmission, thereby improving the visibility of objects placed behind it. To be qualified as antireflective according to ISO 8980-4 standard, such coatings must have a mean light reflection factor below 2.5%. In general, the mean light reflection factor in the visible region Ry on the front and/or rear faces of an ophthalmic lens is between 1.5% to 2.5%.

A reflective coating usually consists of interferential thin layers having the opposite effect, namely increasing the light ray reflection. Such a coating type is used for example to provide solar spectacle lenses with a mirror effect.

US 2017/003520 A1 discloses a mirror-coated lens having a high transmittance and capable of suppressing a flare phenomenon and a ghost phenomenon. The mirror-coated lens includes a lens base material, a functional film containing a low refractive index layer, a high refractive index layer, and a metal layer on a front surface of the lens base material, and a functional film containing a low refractive index layer and a high refractive index layer on a back surface of the lens base material. The luminous reflectance on the front surface side is from 3 to 30%, the transmittance of the eyeglass lens is from 55 to 80%, and the luminous reflectance on the back surface side is from 0.1 to 9%. The disclosed mirror-coated lens is tinted (i.e. is always in a relatively dark date) and does not have a clear (i.e. faded) state, since as disclosed in § [0014] its luminous transmittance does not exceed 80%.

WO 02/14930 A1 discloses an optical lens which has a light reflective or mirror coating on a rear or intermediate surface, and an anti-reflective coating on the front surface. This arrangement helps protect the mirror coating from abrasion, while preventing ghost images due to internal reflections. The lens is suitable for sunglasses, and may comprise back and front lens wafers. The disclosed lens also does not have a clear (i.e. faded) state.

SUMMARY OF THE INVENTION

An object of the invention is to overcome the above-mentioned drawbacks relating to a clear state for the ophthalmic lens, while particularly obtaining for the lens:
- in the clear (i.e. faded) state, acceptable antireflection-like (i.e. low enough back side light reflection) and high enough light transmission performances, and advantageously
- in a dark (i.e. activated) state, acceptable antireflection-like (i.e. a low enough back side light reflection) and higher front side reflection (mirror effect) performances.

Another object of the invention is to provide an ophthalmic lens achieving different and optimized visual performances for the wearer and the observer in both clear and dark states, i.e. specifically achieving a different total visual reflectance in the clear state and in the dark state observed from either front or back sides of the lens, and more specifically achieving a maximized difference in the clear state—and optionally further in the dark state—between the total visual reflectance for the observer (mirror effect) and the wearer (antireflection properties).

For this purpose, an ophthalmic lens according to the invention has a front surface and a rear surface respectively defining a front side and a rear side of the ophthalmic lens, the ophthalmic lens being configured to exhibit a clear state where the ophthalmic lens has a visual transmittance in the visible region at an angle of incidence of 0° greater than 81%, the ophthalmic lens comprising:
- a substrate having a front main face and a rear main face respectively adjacent the front surface and the rear surface, and
- at least one multilayered interferential coating comprising a front multilayered interferential coating which surmounts the front main face and which comprises at least one absorbing front layer in the visible region,
- wherein, in said clear state, a total visual reflectance for the ophthalmic lens in the visible region $R_v\_t\_rear$ from both the rear surface and the front surface, measured from the rear side at an angle of incidence of 35°, is less than 5.0%, and
- wherein in said clear state, the difference $R_v\_t\_front - R_v\_t\_rear$ of the total visual reflectance in the visible region $R_v\_t\_front$ from both the rear surface and the front surface, measured from the front side at an angle of incidence of 15°, and of the total visual reflectance in the visible region $R_v\_t\_rear$ from both the rear surface and the front surface, measured from the rear side at an angle of incidence of between 0 and 15°, is greater than 1.0%.

As explained below, said at least one multilayered interferential coating may contain at least one LI (low index) layer, at least one HI (high index) layer and said at least one absorbing front layer in the visible region and may further contain, at least for said front multilayered interferential coating, said at least one absorbing front layer in the visible region.

It may be noted that said at least one multilayered interferential coating may be formed on at least one of the main faces of the bare substrate (i.e. an uncoated substrate), or on at least one of the main faces of a substrate already coated with one or more functional coatings, such as an anti-abrasion coating or hard coat.

In the present description, the rear (i.e. inner) main face of the substrate is intended to mean the face which, when using the lens, is the nearest from the wearer's eye; it is generally a concave face. On the contrary, the front main face of the substrate, is the face which, when using the lens, is the most distant from the wearer's eye; it is generally a convex face. Nonetheless, the rear surface of the lens may in some cases be convex, e.g. for biconvex lenses for strong hyperopia correction.

As for the substrate, it may be organic or not, the substrate not necessarily being organic in an electrochromic embodiment of the lens, in particular. By way of organic substrate, mention may be made of a thermoplastic or thermosetting plastic material.

According to another feature of the invention, said at least one absorbing front layer may have an absorptance in the visible region greater than 3%. Advantageously, said at least one absorbing front layer may consist of at least one metal or metal oxide, for example a metallic and dielectric mixture or an indium tin oxide (ITO).

According to a preferred embodiment of the invention, said at least one multilayered interferential coating further comprises a rear multilayered interferential coating which surmounts the rear main face and which comprises at least one absorbing rear layer in the visible region, said at least one absorbing rear layer preferably consisting of at least one metal or metal oxide.

In relation to any of the above-features of the invention (including said preferred embodiment):

(i) in said clear state, the ophthalmic lens may have a visual transmittance in the visible region at an angle of incidence of 0° greater than or equal to 85%, (ii) the ophthalmic lens may be further configured to exhibit at least one darker state where the ophthalmic lens has a visual transmittance in the visible region at an angle of incidence of 0° of between 8% and 80%, and said at least one multilayered interferential coating may form in said at least one darker state for the front surface, a visible reflecting coating defined by a total visual reflectance for the ophthalmic lens in the visible region $R_v\_t\_front$ from both the rear surface and the front surface, measured from the front side at an angle of incidence of 15°, which may be greater than 2.5%, (iii) the ophthalmic lens according to (ii) above may have a visual transmittance in the visible region at an angle of incidence of 0° which is of between 8% and 43% and preferably of between 8% and 20%, (iv) in said at least one darker state, the total visual reflectance for the ophthalmic lens according to (ii) or (iii) above in the visible region $R_v\_t\_front$ from both the rear surface and the front surface, measured from the front side at an angle of incidence of 15°, may be equal to or greater than 4.0% and preferably than 5.0%, (v) the ophthalmic lens according to any of (ii) to (iv) above may satisfy at least one and preferably both of the following conditions:

in said clear state, the total visual reflectance for the ophthalmic lens in the visible region $R_v\_t\_rear$ from both the rear side and the front surface, measured from the rear side at an angle of incidence of 35°, is less than 2.5%; and in said clear state, the difference $R_v\_t\_front-R_v\_t\_rear$ of the total visual reflectance in the visible region $R_v\_t\_front$ from both the rear surface and the front surface, measured from the front side at an angle of incidence of 15°, and of the total visual reflectance in the visible region $R_v\_t\_rear$ from both the rear surface and the front surface, measured from the rear side at an angle of incidence of between 0 and 15°, is greater than 2.0%, (vi) in said at least one darker state, the total visual reflectance for the ophthalmic lens according to any of (ii) to (v) above in the visible region $R_v\_t\_rear$ from both the rear surface and the front surface, measured from the rear side at an angle of incidence of 35°, may be less than 1.5% and preferably less than 1.0%, (vii) according to any of (ii) to (vi) above, said at least one multilayered interferential coating may surmount a hard coat covering the organic support and may comprise an alternation of at least one high refractive layered unit of refraction index greater than 1.55 preferably selected from $ZrO_2$, $TiO_2$, ITO, $SnO_2$ and $Ta_2O_5$, and of at least one low refractive layered unit of refraction index lower than 1.55 preferably selected from $SiO_2$, L5 (i.e. "Lima 5"), MgO and $MgF_2$, said at least one multilayered interferential coating preferably having a total thickness of less than 800 nm, (viii) according to said preferred embodiment and to any of (ii) to (vii) above, said front multilayered interferential coating may have a thickness of less than 550 nm and said rear multilayered interferential coating may have a thickness of less than 250 nm, (ix) according to any of (ii) to (viiii) above, the ophthalmic lens may be configured to exhibit said clear state and said at least one darker state by means of the substrate which is photochromic or electrochromic, (x) according to any of (ii) to (ix) above, the ophthalmic lens may be configured to form in said at least one darker state a solar spectacle lens having a mirror front surface, and (xi) according to any of the above features (including said preferred embodiment), in the ophthalmic lens said front surface may be a convex surface and said rear surface may be a concave or convex surface.

It is to be noted that an photochromic or electrochromic lens according to the invention may thus advantageously incorporate, thanks to said at least one absorbing front layer (preferably thanks to both absorbing front layer and absorbing rear layer), asymmetric stacks of different multilayered inferential coatings on the rear and front main faces of the lens substrate, with the achievement of asymmetric performances including different total reflectances in said clear (faded) and darker (activated) states observed from either the front or back sides of the lens.

Such multilayered interferential coatings, that are thus asymmetric as regards their structures and their performances imparted to the lens, make it possible to simultaneously achieve different visual performances for the wearer and the observer in both clear and darker state.

An ophthalmic lens of the invention may be a spectacle lens such as a polarized lens, being for example a photochromic or electrochromic lens, which may be corrective or not.

Further, an ophthalmic lens of the invention may be inserted in a spectacle frame or in a head mounted device (HMD). Non limiting examples of HMDs include immersive and non-immersive devices, in particular see-through devices and see-around devices. HMDs may be either augmented reality devices or virtual reality devices.

A method for manufacturing an ophthalmic lens as defined above may comprise depositing said at least one multilayered interferential coating by physical vapor deposition (PVD), but other techniques to produced interferential stacks (e.g. sputtering, sol-gel, etc.) could be implemented as well in the present invention, for example by:
- optionally ion-beam assisted, evaporation,
- ion-beam sputtering,
- cathode sputtering, or
- plasma-assisted chemical vapor deposition.

These various methods are described in the following references "Thin Film Processes" and "Thin Film Processes II," Vossen & Kern, Ed., Academic Press, 1978 and 1991, respectively. A particularly recommended method is the evaporation under vacuum.

BRIEF DESCRIPTION OF THE DRAWINGS

The present invention will be described in more detail by referring to the appended drawings, wherein.

DETAILED DESCRIPTION OF INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about." Also unless otherwise indicated, the indication of an interval of values «from X to Y» or "between X to Y", according to the present invention, means as including the values of X and Y.

In the present application, when an ophthalmic lens comprises one or more coatings onto the surface thereof, the expression "to deposit a layer or a coating onto the lens" is intended to mean that a layer or a coating is deposited onto the external (exposed) surface of the outer coating of the lens, namely its coating that is the most distant from the substrate.

A coating said to be "on" a substrate or deposited "onto" a substrate is defined as a coating which (i) is positioned above the substrate, (ii) is not necessarily in contact with the substrate, namely one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

Unless stated otherwise, all thicknesses disclosed in the present application relate to physical thicknesses.

General Abbreviations and Definitions Used in the Present Description

Rv (%)—visual reflectance (average luminous reflectance factor in the visible domain calculated using the equation given in ISO 13666:1998 standard and measured according to ISO 8980-4 standard, which is the weighted average of the spectral reflectance over all of the visible spectrum between 380 nm and 780 nm).

Rm (%)—mean reflectance (mean value of the spectral reflectance over a wavelength range of 400 nm to 700 nm.

Tv (%)—visual transmittance (luminous transmittance in the visible domain calculated using the equation given in ISO 13666:1998 standard, which means the average relative light transmission factor in the 380-780 nm wavelength range, weighted according to the sensitivity of the eye at each wavelength of the range and measured under D65 illumination conditions).

FS—Faded state (e.g. state of a photochromic lens which is not activated).

DS—Dark state (e.g. state of a photochromic lens which is activated).

Cc—concave side (usually back side of the ophthalmic lens).

Cx—convex side (usually front side of the ophthalmic lens).

Specific Abbreviations and Definitions Used in the Present Description in the Exemplary and Non Limiting Case where the Back Side of the Lens is Concave Tv_cc_FS—visual transmittance observed/measured from Cc (back) side, faded state.

Tv_cx_FS—visual transmittance observed/measured from Cx (front) side, faded state.

Tv_cc_DS—visual transmittance observed/measured from Cc (back) side, dark state.

Tv_cx_DS—visual transmittance observed/measured from Cx (front) side, dark state.

$R_v$_cc_FS—visual reflectance, Cc side only, measured in faded state.

$R_v$_cx_FS—visual reflectance, Cx side only, measured in faded state.

$R_v$_cc_DS—visual reflectance, Cc side only, measured in dark state.

$R_v$_cx_DS—visual reflectance, Cx side only, measured in dark state.

$R_v$_t_cc_FS—total visual reflectance: reflectance from both sides observed/measured from Cc (back) side, faded state.

$R_v$_t_cx_FS—total visual reflectance: reflectance from both sides, observed/measured from Cx (front) side, faded state.

$R_v$_t_cc_DS—total visual reflectance: reflectance from both sides, observed/measured from Cc (back) side, dark state.

R$_v$_t_cx_DS—total visual reflectance: reflectance from both sides, observed/measured from Cx (front) side, dark state.

General Usable Features of a Lens According to the Present Invention:

Thermoplastic materials usable for the organic substrate may be selected from, for instance: polyamides; polyimide; polysulfones; polycarbonates and copolymers thereof; poly(ethylene terephtalate) and polymethylmethacrylate (PMMA). As used herein, a polycarbonate (PC) is intended to mean either homopolycarbonates or copolycarbonates and block copolycarbonates.

Thermoset materials usable for the substrate may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

Homopolymers of diethylene glycol bis(allyl carbonate) (CR 39®), allylic and (meth)acrylic copolymers, having a refractive index between 1.54 and 1.58, are preferred.

As used herein, a (co) polymer is intended to mean a copolymer or a polymer. As used herein, a (meth)acrylate is intended to mean an acrylate or a methacrylate.

Particularly recommended substrates include those substrates obtained through (co) polymerization of the diethyleneglycol bis-allyl-carbonate, marketed, for example, under the trade name CR-39® by the PPG Industries company (ORMA® lenses, ESSILOR), or polythiourethanes/polysulfides, marketed for instance under MR series by Mitsui, or allylic and (meth)acrylic copolymers, having a refractive index between 1.54 and 1.58.

Prior to depositing the multilayered interferential coating onto the optionally coated substrate, for example with an abrasion-resistant layer and/or a scratch-resistant coating or with a sub-layer, the surface of said optionally coated substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

The multilayered interferential coating may be deposited onto a sub-layer, which then does not belong to the multilayered interferential coating.

Because of its relatively high thickness, the sub-layer does not generally take part to the optical activity of the multilayered interferential coating, especially when it has a refractive index close to that of the underlying coating (which is generally the anti-abrasion and anti-scratch coating) or to that of the substrate, if the sub-layer is directly deposited onto the substrate.

The sub-layer should have a thickness that is sufficient for promoting the abrasion resistance of the multilayered interferential coating, but preferably not to such an extent that a light absorption could be caused, which, depending on the sub-layer nature, could significantly reduce the relative transmission factor w. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

The ophthalmic lens of the invention may contain an additional antistatic layer, so as not to retain and/or develop a substantial static charge, by incorporating at least one charge dissipating conductive layer into the stack present on the surface of the lens.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the interferential coating, provided the properties thereof are not affected. It is preferably located between two layers of the interferential coating, and/or is adjacent to a layer with a high refractive index of such interferential coating. Preferably, the electrically conductive layer is located immediately under a layer with a low refractive index of the interferential coating, most preferably is the penultimate layer thereof by being located immediately under the silica-based outer layer of the interferential coating.

Generally, the front and/or rear main face of the substrate onto which the multilayered interferential coating will be deposited is coated with an impact-resistant primer layer, with an anti-abrasion and/or anti-scratch coating, or with an impact-resistant primer layer coated with an anti-abrasion and/or anti-scratch coating.

The anti-abrasion and/or scratch-resistant coatings are preferably hard coatings based on poly(meth)acrylates or silanes, generally comprising one or more mineral fillers intended to increase the hardness and/or the refractive index of the coating once cured. Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

The anti-abrasion and/or scratch-resistant coating composition may be deposited onto the main face of the substrate by dip- or spin-coating. It is then cured by a suitable method (preferably using heat or ultraviolet radiation). The thickness of the anti-abrasion and/or scratch-resistant coating does generally vary from 2 to 10 µm, preferably from 3 to 5 µm.

Prior to depositing the abrasion-resistant coating and/or the scratch-resistant coating, it is possible to apply onto the substrate a primer coating to improve the impact resistance and/or the adhesion of the subsequent layers in the final product.

An ophthalmic lens according to the invention may also comprise coatings formed on the multilayered interferential coating and capable of modifying the surface properties thereof, such as hydrophobic and/or oleophobic coatings (antifouling top coat). These coatings are preferably deposited onto the outer layer of the multilayered interferential coating, in particular when the outer layer of the multilayered interferential coating is silica based. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Figure 1:
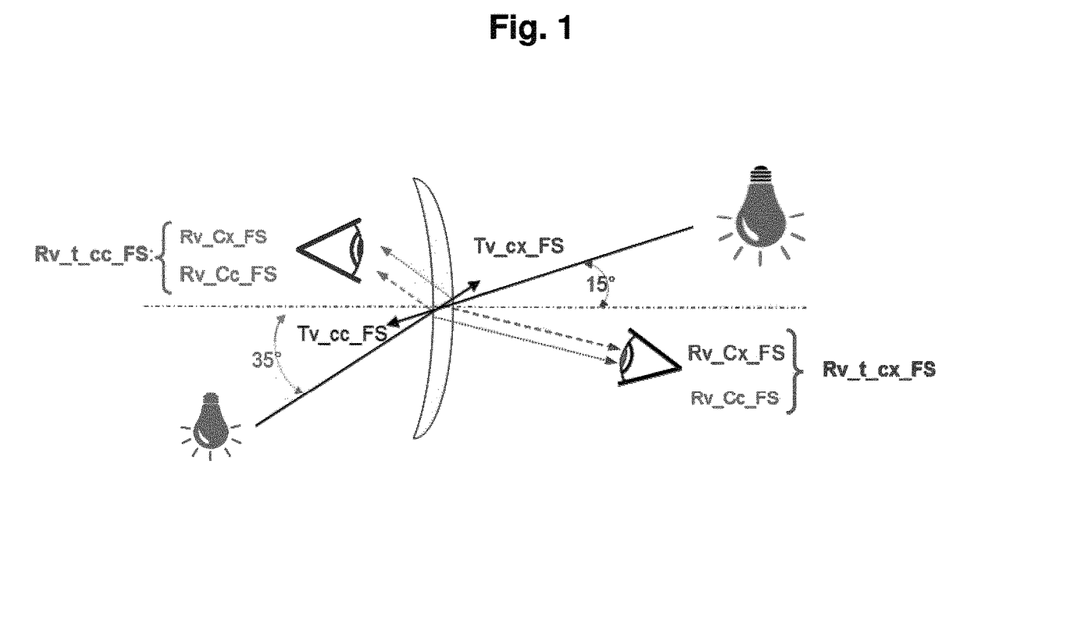
FIG. 1 is a diagrammatic side view of a photochromic spectacle lens in a clear (faded) state, illustrating in that state the reflectance $R_v$ and transmittance Tv of visible luminous radii through both rear and front surfaces of the lens.

With reference to FIG. 1, in the faded (i.e. clear) state, a photochromic lens performs as a clear lens, the absorptance being neglectable.

The visual transmittance Tv, measured from the front (Cx) or back (Cc) side of the lens, is always equal for any corresponding angle of incidence (AOI):

$Tv\_cc\_FS=Tv\_cx\_FS$.

If an antireflection (AR) coating with a neglectable absorptance is applied to the lens (usually on both sides), it will result in a reduced reflection for the wearer of the lens (from the back or Cc side of the lens) and for the observer (from the front or Cx side of the lens).

In this case, the total visual reflectance experienced by the wearer (from the back side) and be the observer (from the front side), measured from Cc or Cx side respectively, will be the same:
Rv_t_cc_FS=Rv_t_cx_FS, and we should have:
Rv_t_cc_FS~Rv_Cc_FS+Rv_Cx_FS
Rv_t_cx_FS~Rv_Cx_FS+R$_v$_Cc_FS This is a desirable feature to increase transparency (visual transmittance) of the lens.

The range of total visual reflectance Rv_t_cc_FS or Rv_t_cx_FS in this case is approximately from 1% to 5% and depends on a particular anti-reflective coating applied.

Figure 2:
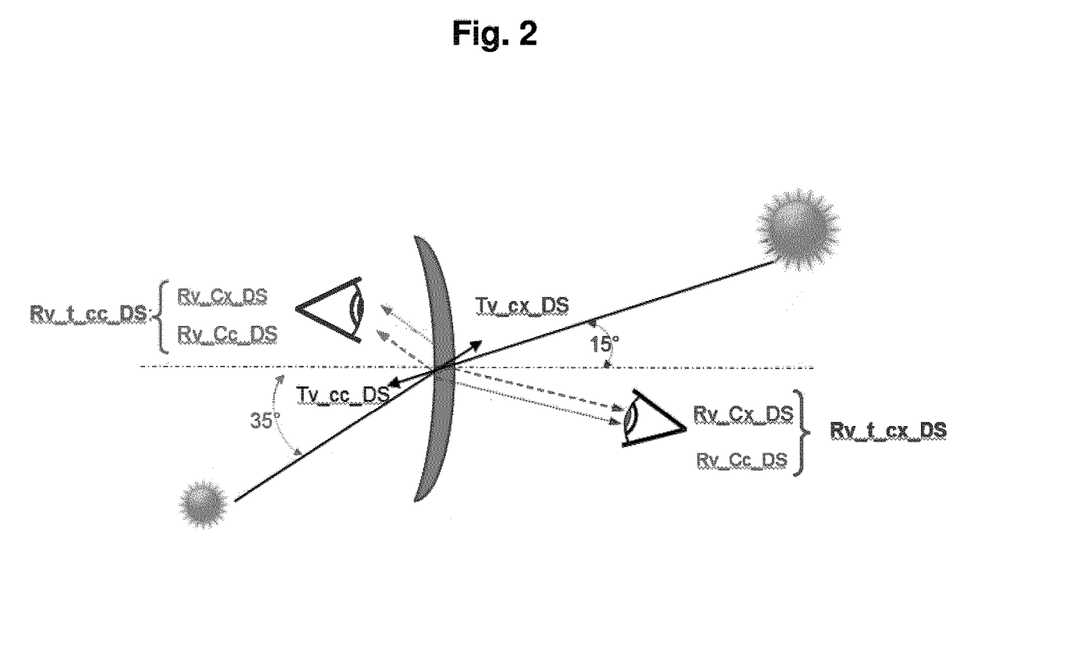
FIG. 2 is a diagrammatic side view of the photochromic spectacle lens of FIG. 1 in a dark (activated) state, illustrating in that state the reflectance $R_v$ and transmittance Tv of visible luminous radii through both rear and front surfaces of the lens.

With reference to FIG. 2, in the dark (i.e. activated) state, the photochromic layer should be activated and introduce absorption for the light passing through the lens. The total reflectance decreases in the dark state due to the photochromic layer absorption.

The visual transmittance Tv, measured from the front (Cx) or back (Cc) side is always equal for any corresponding angle of incidence (AOI):

$Tv\_t\_cc\_DS=Tv\_t\_cx\_DS$

The total visual reflectance Rv_t_cx_DS observed/measured in the dark state from the Cx (front) side will be mainly determined by the visual reflectance Rv_Cx_DS (Cx side only):
Rv_t_cx_DS~Rv_Cx_DS.

The total visual reflectance Rv_t_cc_DS observed/measured in the dark state from the Cc (rear) side will be mainly determined by the visual reflectance Rv_Cc_DS (Cc side only):
Rv_t_cc_DS~Rv_Cc_DS.

If a mirror effect is needed in the dark state as is the case in the present invention, then it appears that the standard usual antireflection coating (AR) would not be adequate, and that an increase of reflection from the front side of the lens in order to increase this mirror effect would undesirably increase the reflection for the wearer in the faded state, which is not acceptable for the wearer due to the desired AR performance.

The following examples illustrate the present invention in a more detailed, but non-limiting manner.

EXAMPLES

All tested comparative lenses C1-C3 and lenses L1-L8 according to the invention were manufactured with:
  an organic lens substrate based on polycarbonate (PC) and known as PC Transitions T7 (Grey), Ct=2 mm,
  a hard coat (V): Mithril 1.6,
  interferential stacks (i.e. multilayered interferential coatings) on both back and front sides of each lens (except for comparative lens C1), with two absorbing layers respectively on the back side (Cc) and front side (Cx) of inventive lenses 11-14 (inventive lenses L5-L8 including only one front side absorbing layer), both stacks being deposited by physical vapor deposition (PVD), with the following PVD evaporation materials abbreviations (all refractive indices for materials are available):
  P: PC T7 substrate
  V: hard coat of Mithril 1.6
  Q: $SiO_2$ (refraction index lower than 1.55)
  Z: $ZrO_2$ (refraction index greater than 1.55)
  I: absorbing layer of ITO (antistatic, refraction index greater than 1.55)
  T: $Ta_2O_5$ (refraction index greater than 1.55)
  L: Lima 5 (refraction index lower than 1.55)
  U: $SiO_2$+ passive $O_2$ (refraction index lower than 1.55)
  G: absorbing layer "Grey A" (metallic and dielectric mixture from UMICORE).

The calculation/measurements environment which was used was as follows:
  Illuminant: D65—Observer: Photopic,
  Ry was measured for AOI Cc=35° (angle of incidence on the concave back side for the wearer) and for AOI Cx=15° (angle of incidence on the convex front side for the observer) for lenses C1-C3 and L1-L2 and also for AOI Cc=15° and AOI Cx=35° for lenses L3-L8,
  $R_m$ was measured for AOI Cc=15° and 35° and for AOI Cx=15° and 35 for lenses L3-L8, and
  $T_v$ was measured under D65 illumination conditions (daylight: AOI=0, 15° or) 35°, In the following examples of tested lenses C1-C3 and L1-L8, the used materials and corresponding thicknesses in nanometers (nm) are given in a direction moving away from the back side (Cc) to the front side (Cx) of each lens, and the optical performances of these tested lenses are recited in the tables below.

1. First Series of Examples Including Three Comparative Lenses C1-C3 of the Prior Art and Two Lenses L1-L2 of the Invention:

Comparative Lens C1:

Traditional lens PC T7 Mi1.5 with only substrate (P: PC T7) and hard coat (V: Mi1.5), no interferential stacks being applied, see following structure with thicknesses in nanometers:

back side—4500V—P—4500V—front side.

Comparative Lens C2:

Traditional lens PC T7 Mi1.6 MC3h with substrate (P: PC T7), hard coat (V: Mi1.6) and interferential stack (MC3h) applied on either sides, see following structure with thicknesses in nanometers:

back side—91.6Q 62.9Z 16.2Q 37.6Z 4500V—P—4500V 37.6Z 16.2Q 62.9Z 91.6Q—front side.

Comparative Lens C3:

Traditional lens PC T7 Mi1.6 BlueS0-BlueS2 with substrate (P: PC T7), hard coat (V: Mi1.6), interferential stack BlueS0 applied on back (Cc) side and interferential stack BlueS2 applied on front (Cx) side, see following structure with thicknesses in nanometers:

back side—89.52Q 7.34I 79.05Z 23.48Q 20.62Z 148.87U 5.93Q 57.09Q 4500V—P—4500V 20.6Z 135.8U 23.7Z 34.7Q 65.9Z 6.5I 81.6Q—front side.

Inventive Lens l1:

Lens with substrate (P: PC T7), hard coat (V: Mi1.6), 5-layer interferential stack ASY v1 s09 cc applied on the back (Cc) side and 7-layer interferential stack ASY v1 s09 cx applied on front (Cx) side, see following structure with thicknesses in nanometers:

back side—98.891Q 79.263Z 14.494Q 8.291I 7.098Z 4500V—P—4500V 53.553Z 45.775I 65.337Q 10.713Z 110.72Q 110.13Z 98.476Q—front side.

L1 thus comprises a front absorbing layer (I) and a rear absorbing layer (I).

Inventive Lens L2:

Lens with substrate (P: PC T7), hard coat (V: Mi1.6), 5-layer interferential stack ASY v4 s05 cc applied on the back (Cc) side and 7-layer interferential stack ASY v4 s05 cx applied on front (Cx) side, see following structure with thicknesses in nanometers:

back side—89.508Q 78.72Z 19.553Q 1.729I 15.83Z 4500V—P—4500V 51.289Z 14.047G 76.252Q 9.862Z 111.728Q 114.892Z 83.474Q—front side.

L2 thus comprises a front absorbing layer (G) and a rear absorbing layer (I).

Table 1 below recites seven parameter values measured for lenses C1-C3 and L1-L2, the values showed in bold meaning that the limit values of the respective criteria are met, contrary to the values showed in italics witnessing that those criteria were not met. These seven parameters were:

1. Visual transmittance should be >81% at 0° AOI (CAT 0), preferably >85% in faded state.
2. Visual transmittance should be >8% at 0° AOI (CAT 3) in dark state.
3. Rv_t_cx_FS—total visual reflectance measured at 0° from Cx (front) side, faded state, no requirements.
4. Rv_t_cc_FS—total visual reflectance measured from Cc (back) side, faded state, should be <5.0%, preferably <2.5% at 35° AOI.
5. Rv_t_cx_DS—total visual reflectance measured from Cx (front) side, dark state, should be >2.5%, preferably >5.0% at 15° AOI.
6. Rv_t_cc_DS—total visual reflectance measured from Cc (back) side, dark state, should be <1.5%, preferably <1.0% at 35° AOI.
7. Delta Rv_t_cx/cc_FS: difference in total visual reflectance measured from front side to total visual reflectance measured from back side for the same lens, this difference being Rv_t_cx_FS−Rv_t_cc_FS: should be >1.0%, preferably >2.0% at AOI from 0° to 15°.

TABLE 1

| Criteria | Parameter (%) | AOI (°) | Limit value (%) | Lens C1 | Lens C2 | Lens C3 | Lens l1 | Lens l2 |
|---|---|---|---|---|---|---|---|---|
| 1 | Tv_cc/cx FS | 0 | >81.00 | 89.51 | 95.37 | 92.13 | 85.71 | 85.88 |
| 2 | Tv_cc/cx DS | 0 | >8.00 | 12.43 | 13.26 | 12.78 | 11.89 | 11.94 |
| 3 | Rv_t_cx FS | 15 | NA | 7.15 | 1.24 | 2.78 | 4.88 | 5.15 |
| 4 | Rv_t_cc FS | 35 | <2.50 | *7.58* | 1.42 | 2.18 | 2.00 | 2.41 |
| 5 | Rv_t_cx DS | 15 | >2.50 | 3.91 | *0.66* | *2.42* | 4.23 | 5.00 |
| 6 | Rv_t_cc DS | 35 | <1.00 | *4.20* | 0.76 | 0.47 | 0.55 | 0.51 |
| 7 | Delta Rv_t_cx/cc FS | 15 | >1.00 | 0.00 | 0.00 | 0.07 | 1.53 | 2.65 |

2. Second Series of Examples Including Six Other Lenses L3-L8 of the Invention:

Inventive Lens L3:

Lens with substrate (P: PC T7), hard coat (V: Mi1.6), 5-layer interferential stack ASY v5 s02 cc applied on the back (Cc) side and 7-layer interferential stack ASY v5 s02 cx applied on front (Cx) side, see following structure with thicknesses in nanometers:

back side—96.967L 95.497T 7.641L 30.224I 0T 4500V—2P—4500V 41.087Z 42.938I 66.888Q 12.96Z 113.216Q 112.502Z 92.483Q—front side.

L3 thus comprises a front absorbing layer (I) and a rear absorbing layer (I).

Tables 2 and 2a below recites the Tv, Rv_t, Delta Rv_t and other parameter values measured for lens L3, including Rm, hue h (°) and chroma C*, with "observer" and "wearer" referring to the front (Cx) side and to the rear (Cc) side, respectively (the values showed in bold meaning that said limit values of the respective criteria are met).

TABLE 2

| State | AOI (°) | Tv (%) | h (°) | C* | Rv_t (%) | h° | C* | Rm (%) |
|---|---|---|---|---|---|---|---|---|
| FS observer/wearer | 0 | 83.61 | 90.0 | 17.0 | NA | NA | NA | NA |
| FS observer | 15.00 | 84.19 | 93.2 | 17.5 | 5.82 | 264.0 | 34.9 | 8.48 |
| FS observer | 35.00 | 85.21 | 102.9 | 17.6 | 4.13 | 293.1 | 44.4 | 7.53 |
| FS wearer | 15.00 | 84.19 | 93.2 | 17.5 | 3.47 | 268.6 | 31.0 | 5.56 |
| FS wearer | 35.00 | 85.21 | 102.9 | 17.6 | 2.44 | 295.4 | 35.3 | 4.28 |
| DS observer | 15.00 | 11.33 | 102.4 | 8.8 | 5.08 | 263.8 | 36.6 | 7.92 |
| DS observer | 35.00 | 10.29 | 113.6 | 9.0 | 3.37 | 296.2 | 49.2 | 7.04 |
| DS wearer | 15.00 | 11.33 | 102.4 | 8.8 | 0.59 | 301.8 | 30.4 | 1.64 |
| DS wearer | 35.00 | 10.29 | 113.6 | 9.0 | 0.57 | 291.8 | 15.9 | 1.18 |

TABLE 2a

| | AOI (°) | Delta Rv_t (%) |
|---|---|---|
| FS observer – FS wearer | 15 | 2.35 |
| DS observer – DS wearer | 15 | 4.48 |
| FS observer – FS wearer | 35 | 1.68 |
| DS observer – DS wearer | 35 | 2.80 |
| DS observer – FS wearer | 15 | 1.61 |
| DS observer – FS wearer | 35 | 0.92 |

Inventive Lens L4:

Lens with substrate (P: PC T7), hard coat (V: Mi1.6), 5-layer interferential stack ASY v5 s07 cc applied on the back (Cc) side and 7-layer interferential stack ASY v5 s07 cx applied on front (Cx) side, see following structure with thicknesses in nanometers:

back side—92.539Q 6.382I 62.249Z 14.489Q 34.248Z 4500V—2P—4500V 43.74Z 17.237G 64.688L 16.527Z 105.746L 109.899Z 74.296Q—front side.

L4 thus comprises a front absorbing layer (G) and a rear absorbing layer (I).

Tables 3 and 3a below recites the Tv, Rv_t, Delta Rv_t and other parameter values measured for lens L4, including Rm, hue h (°) and chroma C*, with "observer" and "wearer" referring to the front (Cx) side and to the rear (Cc) side, respectively (the values showed in bold meaning that said limit values of the respective criteria are met).

TABLE 3

| State | AOI (°) | Tv (%) | h (°) | C* | Rv_t (%) | h° | C* | Rm (%) |
|---|---|---|---|---|---|---|---|---|
| FS observer | 15.00 | 81.38 | 116.3 | 12.0 | 4.94 | 297.5 | 44.3 | 8.52 |
| FS observer | 35.00 | 80.93 | 119.0 | 7.4 | 4.48 | 290.9 | 30.1 | 6.85 |
| FS wearer | 15.00 | 81.38 | 116.3 | 12.0 | 1.41 | 296.5 | 43.9 | 3.40 |
| FS wearer | 35.00 | 80.93 | 119.0 | 7.4 | 1.45 | 298.1 | 30.8 | 3.16 |
| DS observer | 15.00 | 11.04 | 131.8 | 7.3 | 4.58 | 299.2 | 46.5 | 8.22 |
| DS observer | 35.00 | 9.81 | 141.1 | 5.2 | 4.07 | 292.8 | 31.7 | 6.35 |
| DS wearer | 15.00 | 11.04 | 131.8 | 7.3 | 0.46 | 207.8 | 5.1 | 0.67 |
| DS wearer | 35.00 | 9.81 | 141.1 | 5.2 | 0.57 | 238.5 | 1.8 | 0.95 |

TABLE 3a

| | AOI (°) | Delta Rv_t (%) |
|---|---|---|
| FS observer – FS wearer | 15 | 3.53 |
| DS observer – DS wearer | 15 | 4.12 |
| FS observer – FS wearer | 35 | 3.03 |
| DS observer – DS wearer | 35 | 3.50 |
| DS observer – FS wearer | 15 | 3.18 |
| DS observer – FS wearer | 35 | 2.62 |

Inventive Lens L5:

Lens with substrate (P: PC T7), hard coat (V: Mi1.6), 4-layer interferential stack ASY v6 s02 cc applied on the back (Cc) side and 5-layer interferential stack ASY v6 s02 cx applied on front (Cx) side, see following structure with thicknesses in nanometers:

back side—88.803Q 83.51Z 22.15L 21.511Z 4500V—2P—4500V 84.965Z 17.41G 111.073L 111.045Z 59.398Q—front side.

L5 thus comprises only a front absorbing layer (G).

Tables 4 and 4a below recites the Tv, Rv_t, Delta Rv_t and other parameter values measured for lens L5, including Rm, hue h (°) and chroma C*, with "observer" and "wearer" referring to the front (Cx) side and to the rear (Cc) side, respectively (the values showed in bold meaning that said limit values of the respective criteria are met).

TABLE 4

| State | AOI (°) | Tv (%) | h (°) | C* | Rv_t (%) | h° | C* | Rm (%) |
|---|---|---|---|---|---|---|---|---|
| FS observer | 15.00 | 80.99 | 118.7 | 4.0 | 5.51 | 271.7 | 5.1 | 8.56 |
| FS observer | 35.00 | 80.06 | 144.5 | 6.7 | 6.00 | 338.5 | 21.1 | 10.95 |
| FS wearer | 15.00 | 80.99 | 118.7 | 4.0 | 1.75 | 267.9 | 7.5 | 3.44 |
| FS wearer | 35.00 | 80.06 | 144.5 | 6.7 | 2.31 | 346.1 | 15.0 | 4.70 |
| DS observer | 15.00 | 10.90 | 155.7 | 3.8 | 5.37 | 251.5 | 3.9 | 8.22 |
| DS observer | 35.00 | 9.61 | 163.9 | 5.8 | 5.66 | 336.4 | 20.9 | 10.52 |
| DS wearer | 15.00 | 10.90 | 155.7 | 3.8 | 0.27 | 311.0 | 14.7 | 1.15 |
| DS wearer | 35.00 | 9.61 | 163.9 | 5.8 | 0.62 | 4.3 | 11.5 | 1.44 |

TABLE 4a

| | AOI (°) | Delta Rv_t (%) |
|---|---|---|
| FS observer – FS wearer | 15 | 3.75 |
| DS observer – DS wearer | 15 | 5.09 |
| FS observer – FS wearer | 35 | 3.69 |
| DS observer – DS wearer | 35 | 5.04 |
| DS observer – FS wearer | 15 | 3.61 |
| DS observer – FS wearer | 35 | 3.35 |

Inventive Lens L6:

Lens with substrate (P: PC T7), hard coat (V: Mi1.6), 4-layer interferential stack ASY v7v2 cc applied on the back (Cc) side and 6-layer interferential stack ASY v7v2 cx applied on front (Cx) side, see following structure with thicknesses in nanometers:

back side—87.019Q 92.054Z 19.68L 15.442Z 4500V—2P—4500V 12.205G 89.078L 47.744Z 49.716L 132.202Z 72.328Q—front side.

L6 thus comprises only a front absorbing layer (G).

Tables 5 and 5a below recites the Tv, Rv_t, Delta Rv_t and other parameter values measured for lens L6, including Rm, hue h (°) and chroma C*, with "observer" and "wearer" referring to the front (Cx) side and to the rear (Cc) side, respectively (the values showed in bold meaning that said limit values of the respective criteria are met).

TABLE 5

| State | AOI (°) | Tv (%) | h (°) | C* | Rv_t (%) | h° | C* | Rm (%) |
|---|---|---|---|---|---|---|---|---|
| FS observer | 15.00 | 81.39 | 118.8 | 13.0 | 5.70 | 301.8 | 44.9 | 11.34 |
| FS observer | 35.00 | 80.63 | 133.1 | 11.3 | 6.03 | 315.4 | 42.7 | 10.70 |
| FS wearer | 15.00 | 81.39 | 118.8 | 13.0 | 1.57 | 301.5 | 47.8 | 4.67 |
| FS wearer | 35.00 | 80.63 | 133.1 | 11.3 | 1.92 | 316.3 | 43.0 | 4.69 |
| DS observer | 15.00 | 10.99 | 134.7 | 7.9 | 5.55 | 301.9 | 44.5 | 10.97 |
| DS observer | 35.00 | 9.76 | 147.9 | 7.6 | 5.74 | 314.7 | 42.6 | 10.15 |
| DS wearer | 15.00 | 10.99 | 134.7 | 7.9 | 0.28 | 296.6 | 18.5 | 1.11 |
| DS wearer | 35.00 | 9.76 | 147.9 | 7.6 | 0.51 | 330.9 | 16.3 | 1.39 |

TABLE 5a

| | AOI (°) | Delta Rv_t (%) |
|---|---|---|
| FS observer – FS wearer | 15 | 4.13 |
| DS observer – DS wearer | 15 | 5.28 |
| FS observer – FS wearer | 35 | 4.11 |
| DS observer – DS wearer | 35 | 5.23 |
| DS observer – FS wearer | 15 | 3.99 |
| DS observer – FS wearer | 35 | 3.82 |

Inventive Lens L7:

Lens with substrate (P: PC T7), hard coat (V: Mi1.6), 4-layer interferential stack ASYv8 s01 cc applied on the back (Cc) side and 3-layer interferential stack ASY v8 s01 cx applied on front (Cx) side, see following structure with thicknesses in nanometers:

back side—80.846Q 99.749Z 5.848Q 5Z 4500V—2P—4500V 13.262G 9.147Z 148.873Q—front side.

L7 thus comprises only a front absorbing layer (G).

Tables 6 and 6a below recites the Tv, Rv_t, Delta Rv_t and other parameter values measured for lens L7, including Rm, hue h (°) and chroma C*, with "observer" and "wearer" referring to the front (Cx) side and to the rear (Cc) side, respectively (the values showed in bold meaning that said limit values of the respective criteria are met).

TABLE 6

| State | AOI (°) | Tv (%) | h (°) | C* | Rv_t (%) | h° | C* | Rm (%) |
|---|---|---|---|---|---|---|---|---|
| FS observer/wearer | 0 | 81.03 | 109.0 | 5.7 | NA | NA | NA | NA |
| FS observer | 15.00 | 81.24 | 111.0 | 5.8 | 4.95 | 268.1 | 20.9 | 6.46 |
| FS observer | 35.00 | 81.54 | 119.7 | 5.8 | 3.98 | 280.7 | 22.3 | 5.79 |
| FS wearer | 15.00 | 81.24 | 111.0 | 5.8 | 1.37 | 291.1 | 33.8 | 3.31 |
| FS wearer | 35.00 | 81.54 | 119.7 | 5.8 | 1.47 | 311.6 | 33.0 | 3.52 |
| DS observer | 15.00 | 10.99 | 139.9 | 4.2 | 4.68 | 262.5 | 19.2 | 5.73 |
| DS observer | 35.00 | 9.85 | 146.6 | 4.4 | 3.53 | 268.3 | 21.4 | 4.80 |
| DS wearer | 15.00 | 10.99 | 139.9 | 4.2 | 0.45 | 298.1 | 22.5 | 1.45 |
| DS wearer | 35.00 | 9.85 | 146.6 | 4.4 | 0.70 | 326.8 | 25.4 | 1.92 |

TABLE 6a

| | AOI (°) | Delta Rv_t (%) |
|---|---|---|
| FS observer – FS wearer | 15 | 3.58 |
| DS observer – DS wearer | 15 | 4.23 |
| FS observer – FS wearer | 35 | 2.51 |
| DS observer – DS wearer | 35 | 2.83 |
| DS observer – FS wearer | 15 | 3.31 |
| DS observer – FS wearer | 35 | 2.06 |

Inventive Lens L8:

Lens with substrate (P: PC T7), hard coat (V: Mi1.6), 4-layer interferential stack ASYv8 s02 cc applied on the back (Cc) side and 3-layer interferential stack ASY v8 s02 cx applied on front (Cx) side, see following structure with thicknesses in nanometers:

back side—89.863Q 89.672Z 23.844Q 19.547Z 4500V—2P—4500V 11.581G 3Z 166.571Q—front side.

L8 thus comprises only a front absorbing layer (G).

Tables 7 and 7a below recites the Tv, Rv_t, Delta Rv_t and other parameter values measured for lens L8, including Rm, hue h (°) and chroma C*, with "observer" and "wearer" referring to the front (Cx) side and to the rear (Cc) side, respectively (the values showed in bold meaning that said limit values of the respective criteria are met).

TABLE 7

| State | AOI (°) | Tv (%) | h (°) | C* | Rv_t (%) | h° | C* | Rm (%) |
|---|---|---|---|---|---|---|---|---|
| FS observer/wearer | 0 | 81.00 | 114.0 | 4.2 | NA | NA | NA | NA |
| FS observer | 15.00 | 81.13 | 113.9 | 4.2 | 6.51 | 256.6 | 11.6 | 6.94 |
| FS observer | 35.00 | 81.30 | 116.9 | 4.4 | 5.75 | 263.5 | 13.0 | 6.51 |
| FS wearer | 15.00 | 81.13 | 113.9 | 4.2 | 2.00 | 283.0 | 24.5 | 3.33 |
| FS wearer | 35.00 | 81.30 | 116.9 | 4.4 | 2.05 | 297.0 | 19.6 | 3.26 |
| DS observer | 15.00 | 10.99 | 146.9 | 3.6 | 6.38 | 244.2 | 10.2 | 6.49 |
| DS observer | 35.00 | 9.83 | 149.1 | 3.6 | 5.45 | 254.3 | 13.5 | 5.95 |
| DS wearer | 15.00 | 10.99 | 146.9 | 3.6 | 0.24 | 301.5 | 22.7 | 1.12 |
| DS wearer | 35.00 | 9.83 | 149.1 | 3.6 | 0.50 | 333.8 | 14.0 | 1.21 |

TABLE 7a

| | AOI (°) | Delta Rv_t (%) |
|---|---|---|
| FS observer – FS wearer | 15 | 4.51 |
| DS observer – DS wearer | 15 | 6.14 |
| FS observer – FS wearer | 35 | 3.71 |
| DS observer – DS wearer | 35 | 4.95 |
| DS observer – FS wearer | 15 | 4.38 |
| DS observer – FS wearer | 35 | 3.40 |

As a conclusion from the above results, it appears that ophthalmic lenses according to the present invention allow to meet the above-defined criteria relating to visual transmittance in faded state and in dark state, total visual reflectance in faded state and in dark state, and difference in total visual reflectance measured from front side to total visual reflectance measured from back side, such inventive lenses thus being advantageously usable as photochromic or electrochromic antireflection lenses for solar spectacles having a mirror front surface providing a mirror effect for the observer.

The invention claimed is:

1. An ophthalmic lens having a front surface and a rear surface respectively defining a front side and a rear side of the ophthalmic lens, the ophthalmic lens being configured to exhibit a clear state where the ophthalmic lens has a visual transmittance in the visible region at an angle of incidence of 0° greater than 81%, the ophthalmic lens comprising:
   a substrate having a front main face and a rear main face respectively adjacent the front surface and the rear surface; and
   at least one multilayered interferential coating comprising a front multilayered interferential coating which surmounts the front main face and which comprises at least one absorbing front layer in the visible region;
   wherein, in said clear state, a total visual reflectance for the ophthalmic lens in the visible region $R_v$_t_rear from both the rear surface and the front surface, measured from the rear side at an angle of incidence of 35°, is less than 5.0%; and
   wherein in said clear state, the difference $R_v$_t_front– $R_v$_t_rear of the total visual reflectance in the visible region $R_v$_t_front from both the rear surface and the front surface, measured from the front side at an angle of incidence of 15°, and of the total visual reflectance in the visible region $R_v$_t_rear from both the rear surface and the front surface, measured from the rear side at an angle of incidence of between 0 and 15°, is greater than 1.0%.

2. The ophthalmic lens of claim 1, wherein said at least one absorbing front layer has an absorptance in the visible region greater than 3%.

3. The ophthalmic lens of claim 1, wherein said at least one absorbing front layer consists of at least one metal or metal oxide.

4. The ophthalmic lens of claim 1, wherein said at least one multilayered interferential coating further comprises a rear multilayered interferential coating which surmounts the rear main face and which comprises at least one absorbing rear layer in the visible region.

5. The ophthalmic lens of claim 4, wherein said at least one absorbing rear layer consists of at least one metal or metal oxide.

6. The ophthalmic lens of claim 1, wherein in said clear state, the ophthalmic lens has a visual transmittance in the visible region at an angle of incidence of 0° greater than or equal to 85%.

7. The ophthalmic lens of claim 1, wherein the ophthalmic lens is further configured to exhibit at least one darker state where the ophthalmic lens has a visual transmittance in the visible region at an angle of incidence of 0° of between 8% and 80%, and wherein said at least one multilayered interferential coating forms in said at least one darker state for the front surface, a visible reflecting coating defined by a total visual reflectance for the ophthalmic lens in the visible region $R_v$_t_front from both the rear surface and the front surface, measured from the front side at an angle of incidence of 15°, which is greater than 2.5%.

8. The ophthalmic lens of claim 7, wherein in said at least one darker state, the ophthalmic lens has a visual transmittance in the visible region at an angle of incidence of 0° which is of between 8% and 43%.

9. The ophthalmic lens of claim 8, wherein in said at least one darker state, the ophthalmic lens has a visual transmittance in the visible region at an angle of incidence of 0° which is of between 8% and 20%.

10. The ophthalmic lens of claim 7, wherein in said at least one darker state, the total visual reflectance for the ophthalmic lens in the visible region $R_v\_t\_front$ from both the rear surface and the front surface, measured from the front side at an angle of incidence of 15°, is equal to or greater than 4.0%.

11. The ophthalmic lens of claim 10, wherein in said at least one darker state, the total visual reflectance for the ophthalmic lens in the visible region $Rv\_t\_front$ from both the rear surface and the front surface, measured from the front side at an angle of incidence of 15°, is equal to or greater than 5.0%.

12. The ophthalmic lens of claim 7, wherein the ophthalmic lens satisfies at least one of the following conditions:
in said clear state, the total visual reflectance for the ophthalmic lens in the visible region $R_v\ t\_rear$ from both the rear surface and the front surface, measured from the rear side at an angle of incidence of 35°, is less than 2.5%; and
in said clear state, the difference $R_v\_t\_front-R_v\ t\_rear$ of the total visual reflectance in the visible region $R_v\_t\_front$ from both the rear surface and the front surface, measured from the front side at an angle of incidence of 15°, and of the total visual reflectance in the visible region $R_v\_t\_rear$ from both the rear surface and the front surface, measured from the rear side at an angle of incidence of between 0 and 15°, is greater than 2.0%.

13. The ophthalmic lens of claim 7, wherein in said at least one darker state, the total visual reflectance for the ophthalmic lens in the visible region $R_v\_t\_rear$ from both the rear surface and the front surface, measured from the rear side at an angle of incidence of 35°, is less than 1.5.

14. The ophthalmic lens of claim 13, wherein in said at least one darker state, the total visual reflectance for the ophthalmic lens in the visible region $Rv\_t\_rear$ from both the rear surface and the front surface, measured from the rear side at an angle of incidence of 35°, is less than 1.0%.

15. The ophthalmic lens of claim 7, wherein said at least one multilayered interferential coating surmounts a hard coat covering the organic support and comprises an alternation of at least one high refractive layered unit of refraction index greater than 1.55 selected from $ZrO_2$, $TIO_2$, ITO, $SnO_2$ and $Ta_2O_5$, and of at least one low refractive layered unit of refraction index lower than 1.55 selected from $SiO_2$, L5, MgO and $MgF_2$, said at least one multilayered interferential coating preferably having a total thickness of less than 800 nm.

16. The ophthalmic lens of claim 7, wherein said at least one multilayered interferential coating further comprises a rear multilayered interferential coating which surmounts the rear main face and which comprises at least one absorbing rear layer in the visible region, and wherein said front multilayered interferential coating has a thickness of less than 550 nm and said rear multilayered interferential coating has a thickness of less than 250 nm.

17. The ophthalmic lens of claim 7, wherein the ophthalmic lens is configured to exhibit said clear state and said at least one darker state by means of the substrate which is photochromic or electrochromic.

18. The ophthalmic lens of claim 7, wherein the ophthalmic lens is configured to form in said at least one darker state a solar spectacle lens having a mirror front surface.

19. The ophthalmic lens of claim 1, wherein in the ophthalmic lens said front surface is a convex surface and said rear surface is a concave or convex surface.

* * * * *